No. 616,959. Patented Jan. 3, 1899.
P. PARCELLS.
ENGINE VALVE GEAR.
(Application filed Jan. 3, 1898.)
(No Model.) 2 Sheets—Sheet 1.
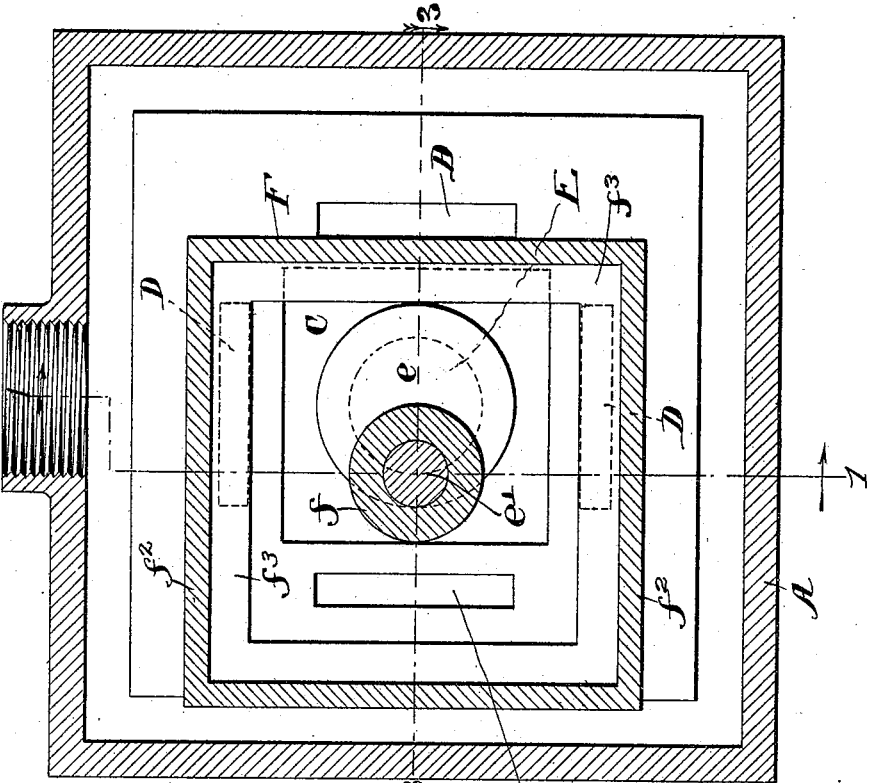
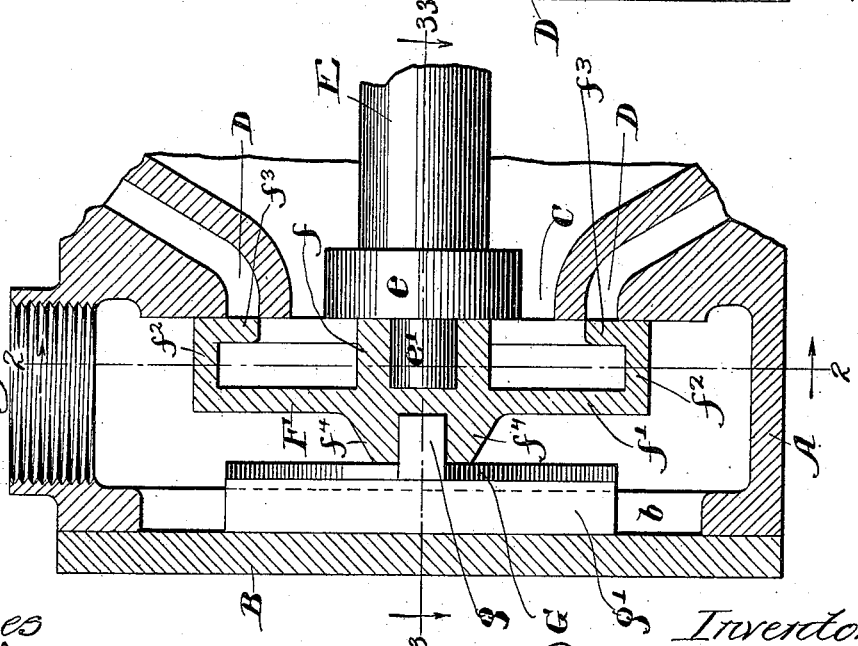
Witnesses Inventor
Paul Parcells
by Wiles Mrau & Bitner
Attys No. 616,959. Patented Jan. 3, 1899.
P. PARCELLS.
ENGINE VALVE GEAR.
(Application filed Jan. 3, 1898.)
(No Model.) 2 Sheets—Sheet 2.
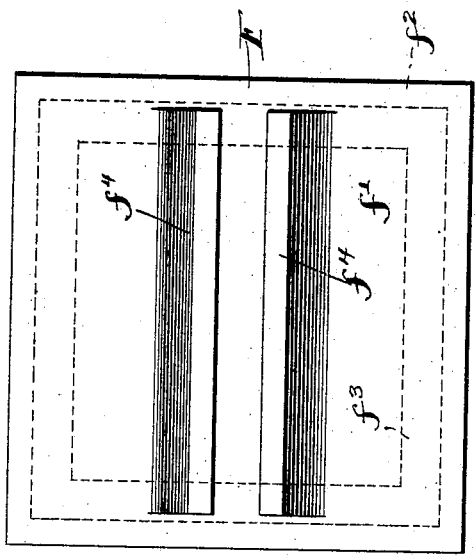
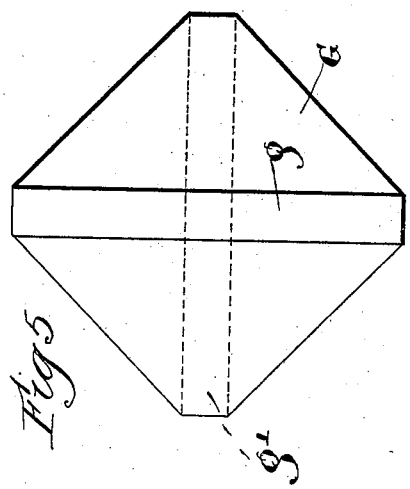
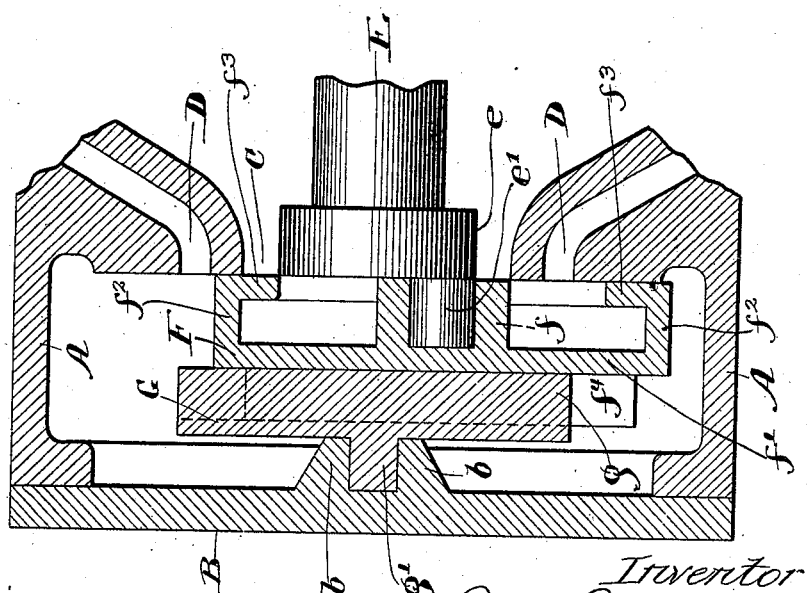

UNITED STATES PATENT OFFICE.

PAUL PARCELLS, OF CHICAGO, ILLINOIS.

ENGINE VALVE-GEAR.

SPECIFICATION forming part of Letters Patent No. 616,959, dated January 3, 1899.

Application filed January 3, 1898. Serial No. 665,346. (No model.)

*To all whom it may concern:*

Be it known that I, PAUL PARCELLS, a citizen of the United States of America, residing at Chicago, in the county of Cook and State of Illinois, have invented certain new and useful Improvements in Engine-Valves, of which the following is a specification.

My invention relates to certain improvements in engine valve-gear of the class in which a single slide-valve operated by a continuously-rotating shaft connected with the valve by means of a wrist-pin is adapted to consecutively open and close a plurality of ports, the object of the invention being to give to such valves a movement adapted to cause an equal amount of wear over the entire surface traversed by the valve, so that such surface may wear evenly and always fit the valve-surface as perfectly as when first made.

To such end the invention consists in the manner in which the valve is guided, so as to give it a motion adapted to accomplish the desired result.

In the drawings, Figure 1 is a section of the valve, together with its casing or chest, in the line 1 1, Fig. 2. Fig. 2 is a section of the same in line 2 2 of Fig. 1. Fig. 3 is a section in line 3 3 of Figs. 1 and 2. Fig. 4 is an under plan of the valve itself as seen in Fig. 1, and Fig. 5 is a top plan of a slide used in guiding the valve and shown in position in Fig. 1 between the valve and the bottom of the casing.

Referring to the drawings, A is a box or chest which forms a casing for the valve, having a removable bottom B, referring to the casing in the position seen in Fig. 1, and having a flat surface opposite from said removable bottom containing a comparatively large central opening C, which acts as the exhaust-port, and a series of adjacent openings or ports D, leading to the engine-cylinders. The central exhaust-port C accommodates a rotating shaft E, upon the end of which is a disk $e$, bearing a wrist-pin $e'$. The valve F slides upon the upper inner surface of the box and has a central boss $f$ journaled upon the wrist-pin $e'$. This boss is an extension of a closed bottom $f'$, from the edges of which extend upward the sides $f^2$, which extend inward at the top in the form of a flange $f^3$ of sufficient width to cover and properly close the ports D. On the bottom of the valve are two guiding-flanges $f^4$, (shown upon the under plan seen in Fig. 4,) and a slide G (shown in Fig. 5) has upon its top a rib $g$, fitted to the groove between the guides $f^4$ and adapted to slide longitudinally between the same. Said slide has upon its under surface and at right angles to the rib $g$ a similar rib $g'$, (shown in dotted lines in Fig. 5 and clearly seen in Figs. 1 and 3,) which slides between guide-flanges $b$ upon the bottom B. The slide itself moves freely longitudinally of the rib $g'$, and the valve moves freely upon the slide in a direction at right angles thereto or longitudinally of the rib $g$. This enables the valve to move freely in any direction, but keeps the axis of said valve constantly in parallel positions—that is, it gives to the valve a free parallel movement in any direction, but effectually prevents any angular movement. This causes every point upon the upper or bearing surface of the valve to describe a circle identical with that described by the wrist-pin $e'$, the surfaces overlapping each other in every direction. The wear is thus distributed evenly over the entire surface and avoids the possibility of uneven wearing away and consequent leakage between the meeting surfaces.

It is possible to vary the specific devices here shown in many particulars, and I therefore do not limit myself to said specific devices nor to their particular form or arrangement.

I claim as new and desire to secure by Letters Patent—

In an engine-valve, the combination with a suitable box, or casing, of a sliding valve mounted therein, a rotating shaft connected therewith by means of a wrist-pin, or crank, and a slide formed with the ribs, $g$, $g'$, arranged at right angles to each other, said valve being formed with guiding-flanges, $f^4$, adapted to embrace the rib, $g$, and the casing being formed with guiding-flanges, $b$, adapted to embrace the flange, $g'$, whereby angular movement of the valve is prevented, but parallel movement thereof is permitted; substantially as described.

In witness whereof I hereunto set my hand, at Chicago, in the county of Cook and State of Illinois, this 30th day of December, A. D. 1897.

PAUL PARCELLS.

Witnesses:
CHAS. O. SHERVEY,
A. I. H. NELSON.